United States Patent
Matsumura et al.

(10) Patent No.: US 12,273,158 B2
(45) Date of Patent: Apr. 8, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 422 days.

(21) Appl. No.: 17/918,760

(22) PCT Filed: Apr. 15, 2020

(86) PCT No.: PCT/JP2020/016635
§ 371 (c)(1),
(2) Date: Oct. 13, 2022

(87) PCT Pub. No.: WO2021/210108
PCT Pub. Date: Oct. 21, 2021

(65) Prior Publication Data
US 2023/0125906 A1    Apr. 27, 2023

(51) Int. Cl.
*H04B 7/024*    (2017.01)

(52) U.S. Cl.
CPC .................... *H04B 7/024* (2013.01)

(58) Field of Classification Search
CPC ...... H04B 7/024; H04W 52/24; H04W 52/32; H04W 72/042; H04W 72/04; H04W 72/0493
See application file for complete search history.

(56) References Cited

U.S. PATENT DOCUMENTS

| | | | |
|---|---|---|---|
| 10,893,431 B2 * | 1/2021 | Liou | H04W 16/28 |
| 10,973,044 B1 * | 4/2021 | Venugopal | H04W 72/23 |
| 11,284,385 B2 * | 3/2022 | Lo | H04L 5/0053 |
| 11,290,174 B2 * | 3/2022 | Zhou | H04B 7/0404 |
| 11,425,701 B2 * | 8/2022 | Venugopal | H04W 72/21 |
| 11,711,787 B2 * | 7/2023 | Cirik | H04W 72/044 370/329 |

(Continued)

FOREIGN PATENT DOCUMENTS

EP    4161190 A1 *    4/2023    ......... H04B 7/06964

OTHER PUBLICATIONS

LG Electronics, 3GPP TSG RAN WG1 #100b, R1-2001915, e-Meeting, Apr. 20-30, 2020, 9 pages.*

(Continued)

*Primary Examiner* — Hai V Nguyen
(74) *Attorney, Agent, or Firm* — Osha Bergman Watanabe & Burton LLP

(57)    ABSTRACT

A terminal according to one aspect of the present disclosure includes: a control section that determines a quasi-co-located (QCL) parameter for downlink, when spatial relation information and path-loss reference signal information for uplink transmission are not provided and default spatial relation and path-loss reference signal enabling information for the uplink transmission is provided, in a case where a plurality of different TCI states mapped to a transmission configuration indication (TCI) code point are not provided; and a transmitting section that transmits the uplink transmission by using the QCL parameter. According to one aspect of the present disclosure, a spatial relation can be appropriately determined.

7 Claims, 6 Drawing Sheets

(56) References Cited

U.S. PATENT DOCUMENTS

| | | | | |
|---|---|---|---|---|
| 11,832,285 | B2* | 11/2023 | Park | H04L 5/0091 |
| 12,069,672 | B2* | 8/2024 | Seo | H04W 72/23 |
| 2019/0297640 | A1* | 9/2019 | Liou | H04L 5/001 |
| 2019/0342907 | A1* | 11/2019 | Huang | H04L 5/0053 |
| 2020/0288479 | A1* | 9/2020 | Xi | H04W 76/27 |
| 2021/0051635 | A1* | 2/2021 | Lo | H04L 5/0051 |
| 2021/0051668 | A1* | 2/2021 | Yu | H04W 72/53 |
| 2021/0105805 | A1* | 4/2021 | Venugopal | H04W 72/046 |
| 2021/0127388 | A1* | 4/2021 | Venugopal | H04L 5/0053 |
| 2021/0135741 | A1* | 5/2021 | Zhou | H04B 7/088 |
| 2021/0135830 | A1* | 5/2021 | Yu | H04B 7/06966 |
| 2021/0297959 | A1* | 9/2021 | Zhou | H04W 72/1263 |
| 2021/0314953 | A1* | 10/2021 | Park | H04W 72/046 |
| 2021/0321379 | A1* | 10/2021 | Cirik | H04L 5/0094 |
| 2022/0086769 | A1* | 3/2022 | Guo | H04W 52/242 |
| 2022/0271890 | A1* | 8/2022 | Grossmann | H04L 5/0051 |
| 2022/0312467 | A1* | 9/2022 | Matsumura | H04L 5/0023 |
| 2022/0338127 | A1* | 10/2022 | Gao | H04W 52/42 |
| 2022/0377784 | A1* | 11/2022 | Matsumura | H04L 5/0044 |
| 2022/0386355 | A1* | 12/2022 | Yi | H04W 72/569 |
| 2022/0394501 | A1* | 12/2022 | Matsumura | H04L 5/0053 |
| 2022/0408371 | A1* | 12/2022 | Matsumura | H04W 52/242 |
| 2023/0010532 | A1* | 1/2023 | Matsumura | H04W 52/242 |
| 2023/0011465 | A1* | 1/2023 | Matsumura | H04W 72/23 |
| 2023/0027512 | A1* | 1/2023 | Cirik | H04L 5/0053 |
| 2023/0046727 | A1* | 2/2023 | Jung | H04W 72/1268 |
| 2023/0061726 | A1* | 3/2023 | Jung | H04L 5/0094 |
| 2023/0133182 | A1* | 5/2023 | Matsumura | H04W 24/10 370/329 |
| 2024/0049192 | A1* | 2/2024 | Cirik | H04W 72/044 |
| 2024/0357605 | A1* | 10/2024 | Seo | H04L 5/0053 |

OTHER PUBLICATIONS

Apple Inc., 3GPP TSG RAN WG1 #100b, R1-2002338, e-Meeting, Apr. 20-30, 2020, 10 pages.*

International Search Report issued in PCT/JP2020/016635 on Nov. 24, 2020 (2 pages).

Written Opinion of the International Searching Authority issued in PCT/JP2020/016635 on Nov. 24, 2020 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In the universal mobile telecommunications system (UMTS) network, the specifications of long term evolution (LTE) have been drafted for the purpose of further increasing data rates, providing low delays, and so on (Non Patent Literature 1). In addition, the specifications of LTE-Advanced (third generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), 6th generation mobile communication system (6G), New Radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

In a future radio communication system (for example, NR), it has been studied that a user terminal (terminal, a user terminal, user equipment (UE)) controls transmission/reception processing on the basis of information regarding quasi-co-location (QCL).

In addition, transmission of a downlink signal using a plurality of transmission/reception points (TRP) has been studied.

However, it is not clear whether or not a spatial relation used in a case where spatial relation information is not provided for uplink transmission is limited to one TRP. If the spatial relation in this case is not appropriately determined, the throughput, the communication quality, and the like may be deteriorated.

Therefore, an object of the present disclosure is to provide a terminal, a radio communication method, and a base station capable of appropriately determining a spatial relation.

Solution to Problem

A terminal according to one aspect of the present disclosure includes: a control section that determines a quasi-co-located (QCL) parameter for downlink, when spatial relation information and path-loss reference signal information for uplink transmission are not provided and default spatial relation and path-loss reference signal enabling information for the uplink transmission is provided, in a case where a plurality of different TCI states mapped to a transmission configuration indication (TCI) code point are not provided; and a transmitting section that transmits the uplink transmission by using the QCL parameter.

Advantageous Effects of Invention

According to one aspect of the present disclosure, a spatial relation can be appropriately determined.

DESCRIPTION OF EMBODIMENTS (Multi-TRPs)

In NR, studies are underway to allow one or more transmission/reception points (TRPs) (multi-TRPs (MTRPs)) to perform DL transmission to UE by using one or more panels (multi-panels). Further, studies are underway to allow the UE to perform UL transmission to one or more TRPs by using one or more panels.

Note that the plurality of TRPs may correspond to the same cell identifier (ID), or may correspond to different cell IDs. The cell ID may be a physical cell ID or a virtual cell ID.

Figure 1:
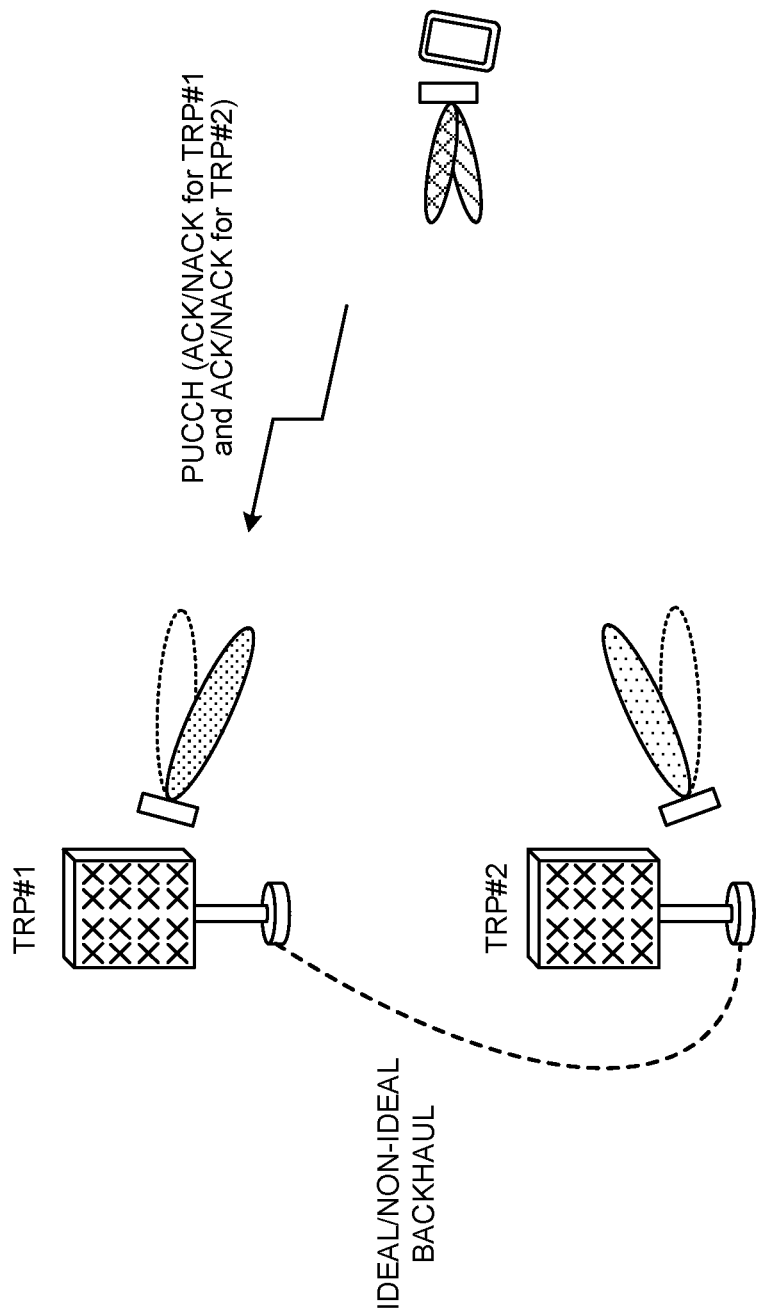
FIG. 1 is a diagram illustrating an example of a multi-TRP scenario.

FIG. 1 is a diagram illustrating an example of a multi-TRP scenario. In these examples, it is assumed that each TRP and UE are capable of transmitting two different beams, but the present disclosure is not limited to this.

The multi-TRPs (TRP #1 and TRP #2) may be connected by an ideal/non-ideal backhaul, and information, data, and the like may be exchanged. A different codeword (CW) and a different layer may be transmitted from each TRP of the multi-TRPs. Non-coherent joint transmission (NCJT) may be used as one form of multi-TRP transmission.

In the NCJT, for example, the TRP #1 performs modulation mapping and layer mapping on a first codeword, performs first precoding in a first number of layers (for example, two layers), and transmits a first PDSCH. In addition, the TRP #2 performs modulation mapping and layer mapping on a second codeword, performs second precoding in a second number of layers (for example, two layers), and transmits a second PDSCH.

Note that a plurality of PDSCHs (multi-PDSCHs) subjected to the NCJT may be defined as partially or completely overlapping at least one of a time domain or a frequency domain. That is, the first PDSCH from a first TRP and the second PDSCH of a second TRP may overlap at least one of time resources or frequency resources.

The first PDSCH and the second PDSCH may be assumed not to be in quasi-co-located (QCL) relation (not to be quasi-co-location (QCL)). Reception of the multi-PDSCHs may be replaced with simultaneous reception of PDSCHs that are not of a certain QCL type (for example, QCL type D.

When a plurality of PDSCHs (which may be referred to as multiple PDSCHs (multi-PDSCHs)) from the multi-TRPs may be scheduled by using one piece of DCI (single DCI or single PDCCH) (single master mode). When each of a plurality of PDSCHs from the multi-TRPs may be scheduled by using a plurality of pieces of DCI (multi-DCI or multiple PDSCHs (multi-PDSCHs)) (multi-master mode).

Such a multi-TRP scenario can perform more flexible transmission control using a high-quality channel.

In RRC configuration information for linking a plurality of pairs of PDSCHs and PDSCHs having a plurality of TRPs, one control resource set (CORESET) in PDCCH configuration information (PDCCH-Config) may correspond to one TRP, to support intra-cell (having the same cell ID) and inter-cell (having different cell IDs) multi-TRP transmission based on the plurality of PDSCHs.

In NR Rel. 15, the maximum number of CORESETs per PDCCH configuration information is 3. In the operation of the plurality of TRPs based on the plurality of PDSCHs, the maximum number of CORESETs per PDCCH configuration information or BWP may be increased to 5 according to the UE capability.

(Default TCI State/Default Spatial Relation/Default PL-RS)

In an RRC connection mode, in both a case where in-DCI TCI information (higher layer parameter TCI-PresentInDCI) is set to "enabled" and a case where the in-DCI TCI information is not configured, when the time offset between the reception of the DL DCI (DCI scheduling the PDSCH) and the corresponding PDSCH (PDSCH scheduled by the DCI) is less than a threshold (timeDurationForQCL) (application condition, first condition), and non-cross-carrier scheduling is performed, a TCI state of the PDSCH (default TCI state) may be a TCI state of a lowest CORESET ID in a most recent slot in an active DL BWP for a CC (of a specific UL signal). Otherwise, the TCI state of the PDSCH (default TCI state) may be a TCI state of a lowest TCI state ID of the PDSCH in the active DL BWP for the scheduled CC.

In Rel. 15, individual MAC CEs of the MAC CE for activation/deactivation of the PUCCH spatial relation and the MAC CE for the activation/deactivation of the SRS spatial relation are required. The PUCCH spatial relation follows the SRS spatial relation.

In Rel. 16, at least one of the MAC CE for the activation/deactivation of the PUCCH spatial relation or the MAC CE for the activation/deactivation of the SRS spatial relation may not be used.

In FR2, when both the spatial relation and the PL-RS for the PUCCH are not configured (application condition, second condition), the default assumption of the spatial relation and the PL-RS (the default spatial relation and the default PL-RS) is applied to the PUCCH. In FR2, when both the spatial relation and the PL-RS for the SRS (SRS resource for the SRS or SRS resource corresponding to the SRI in the DCI format 0_1 for scheduling the PUSCH) are not configured (application condition, second condition), the default assumption of the spatial relation and the PL-RS (the default spatial relation and the default PL-RS) is applied to the PUSCH and the SRS scheduled by the DCI format 0_1.

When a CORESET is configured in the active DL BWP on the CC, the default spatial relation and the default PL-RS may be in a TCI state or QCL assumption of a CORESET having the lowest CORESET ID in the active DL BWP.

When a CORESET is not configured in the active DL BWP on the CC, the default spatial relation and the default PL-RS may be in an active TCI state having the lowest ID of the PDSCH in the active DL BWP.

In Rel. 15, a spatial relation of a PUSCH scheduled by a DCI format 0_0 follows a spatial relation of a PUCCH resource having a lowest PUCCH resource ID among active spatial relations of PUCCHs on the same CC. Even when the PUCCH is not transmitted on SCell, a network needs to update PUCCH spatial relations on all SCells.

In Rel. 16, no PUCCH configuration is required for the PUSCH scheduled by the DCI format 0_0. For the PUSCH scheduled by the DCI format 0_0, when there is no active PUCCH spatial relation or no PUCCH resource on the active UL BWP in the CC (application condition, second condition), the default spatial relation and the default PL-RS are applied to the PUSCH.

Further, the above-mentioned threshold may be referred to as QCL time duration "timeDurationForQCL", "threshold", "threshold for offset between a DCI indicating a TCI state and PDSCH scheduled by the DCI", "threshold-SchedOffset", a schedule offset threshold, a scheduling offset threshold, or the like.

It is not clear whether the default spatial relation/default PL-RS is restricted to a single TRP case, is applied to multi-TRPs based on single DCI, or the like. If the spatial relation/PL-RS is not appropriately determined, there is a risk of a decrease in throughput, a decrease in communication quality, and the like.

Therefore, the present inventors have conceived a method for determining the default spatial relation/default PL-RS.

In the present disclosure, "A/B" and "at least one of A or B" may be replaced with each other. In the present disclosure, the cell, the CC, the carrier, the BWP, the active DL BWP, the active UL BWP, and the band may be replaced with each other. In the present disclosure, an RRC parameter, a higher layer parameter, an RRC information element (IE), and an RRC message may be replaced with each other. In the present disclosure, an index, an ID, an indicator, a resource ID, and the like may be replaced with each other.

In the present disclosure, a panel, an uplink (UL) transmission entity, a TRP, spatial relation, a control resource set (CORESET), a PDSCH, a codeword, a base station, an antenna port (for example, a demodulation reference signal (DMRS) port) of a signal, an antenna port group (for example, a DMRS port group) of a signal, a group for multiplexing (for example, a code division multiplexing (CDM) group, a reference signal group, and a CORESET group), a CORESET pool, a CW, a redundancy version (RV), and a layer (MIMO layer, transmission layer, and spatial layer) may be replaced with each other. Further, the panel identifier (ID) and the panel may be replaced with each other. In the present disclosure, the TRP ID and the TRP may be replaced with each other.

In the present disclosure, the beam, the TCI state, the QCL assumption, the QCL parameter, the spatial domain reception filter, the UE spatial domain reception filter, the UE reception beam, the DL reception beam, the DL precoding, the DL precoder, the DL-RS, the RS of QCL type D of the TCI state or the QCL assumption, and the RS of QCL type A of the TCI state or the QCL assumption may be replaced with each other. In the present disclosure, the QCL type X-RS, the DL-RS associated with QCL type X, the DL-RS with QCL type X, a source of the DL-RS, the SSB, and the CSI-RS may be replaced with each other.

In the present disclosure, the beam, the spatial setting, the spatial relation, the spatial relation information, the spatial relation assumption, the QCL parameter, the spatial domain transmission filter, the UE spatial domain transmission filter, the UE transmission beam, the UL transmission beam, the UL precoding, the UL precoder, the spatial relation RS, the DL-RS, the QCL assumption, the SRI, the spatial relation based on the SRI, the UL TCI, and the PL-RS may be replaced with each other.

In the present disclosure, X is quasi co-located ((QCLed)) with Y, X and Y are quasi co-located with 'QCL-TypeD', X and Y are quasi co-located with respect to 'QCL-TypeD', and X and Y are in a relation of QCL type D may be replaced with each other. X and Y may be RS or RS resources.

In the present disclosure, the downlink (DL), the DL resource, the DL signal, the DL channel, the PDCCH, the PDSCH, and the CORESET may be replaced with each other.

In the present disclosure, the uplink (UL) transmission, the UL signal, the UL channel, the PUCCH (individual PUCCH), the SRS (individual SRS), the PUSCH scheduled by the DCI format 0_1, and the PUSCH scheduled by the DCI format 0_0 may be replaced with each other.

In the present disclosure, lowest, highest, minimum, and maximum may be replaced with each other.

(Radio Communication Method)

In the present disclosure, the UE in which the plurality of TRPs are configured may determine at least one of the TRP corresponding to the DCI, the TRP corresponding to the PDSCH or the UL transmission (PUCCH, PUSCH, SRS, or the like) scheduled by the DCI, or the like, on the basis of at least one of the following.

- A value of a predetermined field (for example, a field for specifying the TRP, an antenna port field, and PRI) included in the DCI.
- DMRS (for example, a sequence of the DMRS, a resource, a CDM group, a DMRS port, a DMRS port group, an antenna port group, or the like) corresponding to the scheduled PDSCH/PUSCH.
- DMRS (for example, a sequence of the DMRS, a resource, a CDM group, a DMRS port, a DMRS port group, or the like) corresponding to the PDCCH on which the DCI is sent.
- CORESET (for example, a CORESET pool ID of the CORESET, an ID of the CORESET, a scramble ID (which may be replaced with a sequence ID), a resource, and the like) receiving DCI
- RS (such as RS-related group) used for the TCI state, the QCL assumption, the spatial relation information, and the like.

In the present disclosure, a single PDCCH (DCI) may be referred to as a PDCCH (DCI) of a first scheduling type (for example, scheduling type A (or type 1)). Further, multi-PDCCHs (DCI) may be referred to as a PDCCH (DCI) of a second scheduling type (for example, scheduling type B (or type 2)).

In the present disclosure, the single PDCCH may be assumed to be supported in the case where multi-TRPs use ideal backhaul. The multi-PDCCHs may be assumed to be supported in the case where the multi-TRPs use non-ideal backhaul.

Note that the ideal backhaul may be referred to as a DMRS port group type 1, a reference signal related group type 1, an antenna port group type 1, a CORESET pool type 1, and the like. Note that the non-ideal backhaul may be referred to as a DMRS port group type 2, a reference signal related group type 2, an antenna port group type 2, a CORESET pool type 2, and the like. The name is not limited thereto.

In the present disclosure, provision, configuration, and activation may be replaced with each other. In the present disclosure, the "UE is not provided with different values of the CORESET pool index in the CORESET information, or the UE is not provided with two different TCI states mapped to one TCI code point", and the "UE is not provided with different values of the CORESET pool index in the CORESET information, and the UE is not provided with two different TCI states mapped to one TCI code point" may be replaced with each other.

First Embodiment

The default spatial relation/default PL-RS may not be applied to the multi-TRPs (multi-TRPs based on single DCI and multi-TRPs based on multi-DCI). The default spatial relation/default PL-RS may be applied only to a single TRP.

The UE may follow at least one of the following procedures 1 to 4.

<<Procedure 1>>

For the PUCCH, when the following conditions 1-1 to 1-4 are satisfied, the UE may follow the following procedure 1-1.

[Condition 1-1] The UE is not provided with a path-loss reference RS (for example, pathlossReferenceRS).

[Condition 1-2]

The UE is not provided with PUCCH spatial relation information (for example, PUCCH-SpatialRelationInfo).

[Condition 1-3]

The UE is provided with information (default beam path-loss enabling parameter for the PUCCH, for example, enableDefaultBeamPlForPUCCH) indicating enabling a default spatial relation and a default PL-RS for the PUCCH.

[Condition 1-4]

The UE is not provided with different values for the CORESET pool index (for example, CORESETPoolIndex) in the CORESET information (for example, ControlResourceSet), or the UE is not provided with two different TCI states mapped to one TCI code point. The provision, the configuration, and the activation may be replaced with each other. The two different TCI states, the two TCI states, and the two TCI states other than the two identical TCI states may be replaced with each other. The TCI state and the TCI state for the PDSCH may be replaced with each other. The "UE is not provided with two different TCI states mapped to one TCI code point" and the "UE is not provided with two different TCI states mapped to one TCI code point in an active DL BWP in a CC" may be replaced with each other. One DCI code point, a lowest DCI code point, one TCI code point, a lowest TCI code point, one code point of the TCI field, and a lowest code point of the TCI field may be replaced with each other.

[Procedure 1-1]

The UE determines an RS resource index qd which provides RS resources with 'QCL-TypeD' in a TCI state or a QCL assumption of CORESET with a lowest index in an active DL BWP of the same serving cell.

Figure 2:
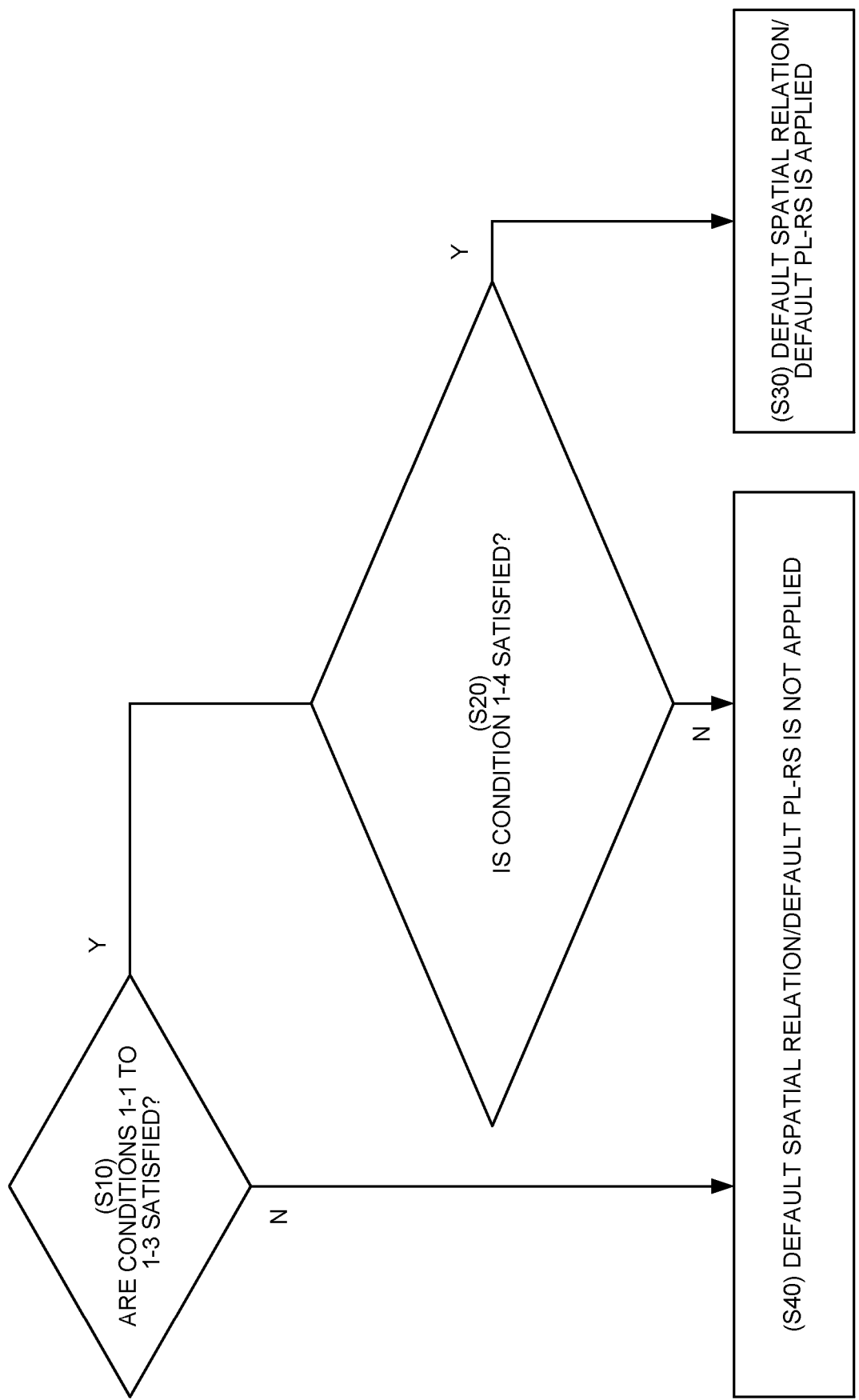
FIG. 2 is a diagram illustrating an example of an operation of determining a default spatial relation/default PL-RS.

As illustrated in FIG. 2, when the conditions 1-1 to 1-3 are satisfied (S10: Y) and the condition 1-4 is satisfied (S20: Y), the default spatial relation/default PL-RS is applied (S30). When the conditions 1-1 to 1-3 are not satisfied (S10: N) or when the condition 1-4 is not satisfied (S20: N), the default spatial relation/default PL-RS is not applied (S40).

<<Procedure 2>>

For the SRS, when the following conditions 2-1 to 2-4 are satisfied, the UE may follow the following procedure 1-1.

[Condition 2-1]
The UE is not provided with a path-loss reference RS (for example, pathlossReferenceRS) or a path-loss reference RS for the SRS (for example, SRS-pathlossReferenceRS).
[Condition 2-2]
The UE is not provided with spatial relation information (for example, spatialRelationInfo).
[Condition 2-3]
The UE is provided with information (default beam path-loss enabling parameter for the SRS, for example, enableDefaultBeamPlForSRS) indicating enabling a default spatial relation and a default PL-RS for the SRS.
[Condition 2-4]
The UE is not provided with different values for the CORESET pool index (for example, CORESETPoolIndex) in the CORESET information (for example, ControlResourceSet), or the UE is not provided with two different TCI states mapped to one TCI code point. The provision, the configuration, and the activation may be replaced with each other. The two different TCI states, the two TCI states, and the two TCI states other than the two identical TCI states may be replaced with each other. The TCI state and the TCI state for the PDSCH may be replaced with each other. The "UE is not provided with two different TCI states mapped to one TCI code point" and the "UE is not provided with two different TCI states mapped to one TCI code point in an active DL BWP in a CC" may be replaced with each other. One DCI code point, a lowest DCI code point, one TCI code point, a lowest TCI code point, one code point of the TCI field, and a lowest code point of the TCI field may be replaced with each other.
[Procedure 2-1]
The UE determines an RS resource index qd which provides RS resources with "QCL-Type D" ('QCL-TypeD') in a TCI state or a QCL assumption of the following parameters 2-1-1 or 2-1-2.
[[Parameter 2-1-1]]
TCI state or QCL assumption of CORESET with a lowest index within the active DL BWP, when CORESET is provided within the active DL BWP.
[[Parameter 2-1-2]]
Active PDSCH TCI state with a lowest ID, when CORESET is not provided within the active DL BWP.
<<Procedure 3>>
For the PUCCH, when the following conditions 3-1 to 3-5 are satisfied, the spatial setting (spatial relation) may follow the following procedure 3-1.
[Condition 3-1]
The UE reports UE capability information (for example, beamCorrespondenceWithoutUL-BeamSweeping) indicating supporting beam correspondence without UL beam sweeping.
[Condition 3-2]
The UE is not provided with a path-loss reference signal (for example, pathlossReferenceRSs) in a PUCCH power control parameter (for example, PUCCH-PowerControl).
[Condition 3-3]
The UE is provided with information (default beam path-loss enabling parameter for the PUCCH, for example, enableDefaultBeamPlForPUCCH) indicating enabling a default spatial relation and a default PL-RS for the PUCCH.
[Condition 3-4]
The UE is not provided with PUCCH spatial relation information (PUCCH-SpatialRelationInfo).
[Condition 3-5]
The UE is not provided with different values for the CORESET pool index (for example, CORESETPoolIndex) in the CORESET information (for example, ControlResourceSet), or the UE is not provided with two different TCI states mapped to one TCI code point. The provision, the configuration, and the activation may be replaced with each other. The two different TCI states, the two TCI states, and the two TCI states other than the two identical TCI states may be replaced with each other. The TCI state and the TCI state for the PDSCH may be replaced with each other. The "UE is not provided with two different TCI states mapped to one TCI code point" and the "UE is not provided with two different TCI states mapped to one TCI code point in an active DL BWP in a CC" may be replaced with each other. One DCI code point, a lowest DCI code point, one TCI code point, a lowest TCI code point, one code point of the TCI field, and a lowest code point of the TCI field may be replaced with each other.
[Procedure 3-1]
The spatial setting for PUCCH transmission from the UE is the same as the spatial setting for PDCCH reception by the UE in CORESET with a lowest ID on an active DL BWP of its primary cell (PCell).
<<Procedure 4>>
For the SRS, when the following conditions 4-1 to 4-4 are satisfied, the UE may follow the following procedure
[Condition 4-1]
The default beam path-loss enabling information for the SRS (for example, higher layer parameter enableDefaultBeamPlForSRS) is set to "enabled".
[Condition 4-2]
The spatial relation information (for example, higher layer parameter spatialRelationInfo) for SRS resources other than the SRS resource having the application (higher layer parameter usage) in the SRS resource set set to "beam management (for example, beamManagement)" or the SRS resource having the application in the SRS resource set set to "nonCodeBook with a configuration of the associated CSI-RS (for example, associatedCSI-RS) is not configured in FR2.
[Condition 4-3]
The UE is not configured with a path-loss reference RS (for example, higher layer parameter pathlossReferenceRS).
[Condition 4-4]
The UE is not provided with different values for the CORESET pool index (for example, CORESETPoolIndex) in the CORESET information (for example, ControlResourceSet), or the UE is not provided with two different TCI states mapped to one TCI code point. The provision, the configuration, and the activation may be replaced with each other. The two different TCI states, the two TCI states, and the two TCI states other than the two identical TCI states may be replaced with each other. The TCI state and the TCI state for the PDSCH may be replaced with each other. The "UE is not provided with two different TCI states mapped to one TCI code point" and the "UE is not provided with two different TCI states mapped to one TCI code point in an active DL BWP in a CC" may be replaced with each other. One DCI code point, a lowest DCI code point, one TCI code point, a lowest TCI code point, one code point of the TCI field, and a lowest code point of the TCI field may be replaced with each other.
[Procedure 4-1]
The UE transmits a target SRS resource with a spatial domain transmission filter of the following parameter 4-1-1 or 4-1-2.

[[Parameter 4-1-1]]

Spatial domain transmission filter used to receive CORESET with the lowest CORESET ID in the active DL BWP in the CC.

[[Parameter 4-1-2]]

Spatial domain transmission filter used to receive the active TCI state with the lowest ID among the active TCI states applicable to PDSCH in the active DL BWP of the CC, when the UE does not configure any CORESET in the CC.

According to the first embodiment described above, the UE can appropriately determine the spatial relation/PL-RS for the UL transmission, when multi-TRPs are configured. In addition, the UE can appropriately determine the default spatial relation/default PL-RS for the UL transmission, when a single TRP is configured.

Second Embodiment

The default spatial relation/default PL-RS may be applied to multi-TRPs based on single DCI.

By the same rule as the default TCI state for the PDSCH of the multi-TRPs based on the single DCI, the default spatial relation/default PL-RS for UL transmission of the multi-TRPs based on the single DCI may be determined.

The UE may use the default TCI state for the PDSCH of the multi-TRPs based on the single DCI for the default spatial relation/default PL-RS for the UL transmission of the multi-TRPs based on the single DCI. For the UL transmission of the multi-TRPs based on the single DCI, the conditions using the default spatial relation/default PL-RS may be that the conditions 1-1 to 1-3 in the first embodiment are satisfied, or that the conditions 2-1 to 2-3 in the first embodiment are satisfied.

The UE may determine the default TCI state for the PDSCH of the multi-TRPs based on the single DCI according to the following procedure 1.

<<Procedure 1>>

When the following conditions 1-1 to 1-3 are satisfied, the UE may follow the following procedure 1-1.

[Condition 1-1]

The offset between the reception of DL DCI and its corresponding PDSCH is smaller than a threshold (for example, time length for QCL, timeDurationForQCL).

[Condition 1-2]

At least one configured TCI state for the serving cell of the scheduled PDSCH includes "QCL-type D".

[Condition 1-3]

At least one TCI code point indicates two TCI states.

[Procedure 1-1]

The UE assumes that a DMRS port of a PDSCH of a serving cell is quasi co-located with an RS for a QCL parameter associated with a TCI state corresponding to a lowest code point in TCI code points including two different TCI states.

<<Application Conditions>>

When at least one of the following conditions A-1 and A-2 is satisfied, the UE may determine the default TCI state/default spatial relation/default PL-RS, according to the procedures 1 and 2 described above.

[Condition A-1]

The UE is not provided with different values for the CORESET pool index (for example, CORESETPoolIndex) in the CORESET information (for example, ControlResourceSet), or the UE is not provided with two different TCI states mapped to one TCI code point. The provision, the configuration, and the activation may be replaced with each other. The two different TCI states, the two TCI states, and the two TCI states other than the two identical TCI states may be replaced with each other. The TCI state and the TCI state for the PDSCH may be replaced with each other. The "UE is not provided with two different TCI states mapped to one TCI code point" and the "UE is not provided with two different TCI states mapped to one TCI code point in an active DL BWP in a CC" may be replaced with each other. One DCI code point, a lowest DCI code point, one TCI code point, a lowest TCI code point, one code point of the TCI field, and a lowest code point of the TCI field may be replaced with each other.

[Condition A-2]

The UE reports supporting the default TCI state (UE capability information) for the multi-TRPs based on the single DCI (single-DCI based multi-TRP).

In the present disclosure, supporting the default TCI state for the multi-TRPs based on the single DCI, supporting the default QCL assumption with the two TCI states, and supporting the default QCL assumption with the two TCI states for the multi-TRPs based on the single DCI may be replaced with each other.

According to the second embodiment described above, the UE can appropriately determine the default spatial relation/default PL-RS, when the multi-TRPs based on the single DCI are configured.

Third Embodiment

The default spatial relation/default PL-RS may be applied to the multi-TRPs based on the multi-DCI.

By the same rule as the default TCI state for the PDSCH of the multi-TRPs based on the multi-DCI, the default spatial relation/default PL-RS for UL transmission of the multi-TRPs based on the multi-DCI may be determined.

The UE may use the default TCI state for the PDSCH of the multi-TRPs based on the multi-DCI for the default spatial relation/default PL-RS for the UL transmission of the multi-TRPs based on the multi-DCI. For the UL transmission of the multi-TRPs based on the multi-DCI, the conditions using the default spatial relation/default PL-RS may be that the conditions 1-1 to 1-3 in the first embodiment are satisfied, or that the conditions 2-1 to 2-3 in the first embodiment are satisfied.

The UE may determine the default TCI state for the PDSCH of the multi-TRPs based on the multi-DCI, according to the following procedure 1.

<<Procedure 1>>

When the following conditions 1-1 to 1-3 are satisfied, the UE may follow the following procedure 1-1.

[Condition 1-1]

The UE is configured with a PUCCH configuration (for example, higher layer parameter PDCCH-Config) that includes two different values for the CORESET pool index (for example, CORESETPoolIndex) in the CORESET information (for example, ControlResourceSet).

[Condition 1-2]

Both a case that the TCI presence information (for example, tci-PresentInDCI) in the DCI is set to 'enabled' and a case that the TCI presence information in the DCI is not configured, in the RRC connected mode.

[Condition 1-3]

The offset between the reception of DL DCI and its corresponding PDSCH is smaller than a threshold (for example, time length for QCL, timeDurationForQCL).

[Procedure 1-1]

The UE assumes that the DMRS port of the PDSCH associated with the value of the CORESET pool index of the serving cell is quasi co-located with the RS for the QCL parameter used for the PDCCH Quasi-Co-Location indication of the specific CORESET. The specific CORESET is a CORESET that is associated with the monitored search space and has the lowest CORESET-ID among CORESETs that are configured with the same value of the CORESET pool index as the PDCCH that schedules the PDSCH in the active BWP of the serving cell, in the latest slot in which one or more CORESETs associated with the same value of the CORESET pool index as the PDCCH that schedules the PDSCH are monitored by the UE.

<<Application Conditions>>

When at least one of the following condition A-1 or A-2 is satisfied, the UE may determine a default TCI state/default spatial relation/default PL-RS for the single DCI for the multi-TRPs, according to the procedure 1 described above.

[Condition A-1]

The UE is provided with different values for the CORESET pool index (for example, CORESETPoolIndex) in the CORESET information (for example, ControlResourceSet). The provision, the configuration, and the activation may be replaced with each other.

[Condition A-2]

The UE reports supporting a default TCI state (UE capability information) for the multi-TRPs based on the multi-DCI (multi-DCI based multi-TRP).

In the present disclosure, supporting the default TCI state for the multi-TRPs based on the multi-DCI, supporting the default QCL assumption for each CORESET pool index, and supporting the default QCL assumption for each CORESET pool index for the multi-TRPs based on the multi-DCI may be replaced with each other.

The second embodiment and the third embodiment may be combined. At least one of the second embodiment or the third embodiment may be defined in the specification.

According to the third embodiment described above, the UE can appropriately determine the default spatial relation/default PL-RS, when the multi-TRPs based on the multi-DCI are configured.

Fourth Embodiment

The default spatial relation/default PL-RS may not be applied to the multi-TRPs (multi-TRPs based on the single DCI and multi-TRPs based on the multi-DCI). The default spatial relation/default PL-RS may be applied only to a single TRP.

The UE may follow at least one of the following procedures 1 to 4.

<<Procedure 1>>

For the PUCCH, when the following conditions 1-1 to 1-4 are satisfied, the UE may follow the following procedure 1-1.

[Condition 1-1]

The UE is not provided with a path-loss reference RS (for example, pathlossReferenceRS).

[Condition 1-2]

The UE is not provided with PUCCH spatial relation information (for example, PUCCH-SpatialRelationInfo).

[Condition 1-3]

The UE is provided with information (default beam path-loss enabling parameter for the PUCCH, for example, enableDefaultBeamPlForPUCCH) indicating enabling a default spatial relation and a default PL-RS for the PUCCH.

[Condition 1-4]

The UE is not provided with different values for a CORESET pool index (for example, CORESETPoolIndex) in CORESET information (for example, ControlResourceSet) in an active DL BWP of a CC.

[Procedure 1-1]

The UE determines an RS resource index qd which provides RS resources with 'QCL-TypeD' in a TCI state or a QCL assumption of CORESET with a lowest index in an active DL BWP of the same serving cell.

<<Procedure 2>>

For the SRS, when the following conditions 2-1 to 2-4 are satisfied, the UE may follow the following procedure

[Condition 2-1]

The UE is not provided with a path-loss reference RS (for example, pathlossReferenceRS) or a path-loss reference RS for the SRS (for example, SRS-pathlossReferenceRS).

[Condition 2-2]

The UE is not provided with spatial relation information (for example, spatialRelationInfo).

[Condition 2-3]

The UE is provided with information (default beam path-loss enabling parameter for the SRS, for example, enableDefaultBeamPlForSRS) indicating enabling a default spatial relation and a default PL-RS for the SRS.

[Condition 2-4]

The UE is not provided with different values for a CORESET pool index (for example, CORESETPoolIndex) in CORESET information (for example, ControlResourceSet) in an active DL BWP of a CC.

[Procedure 2-1]

The UE determines an RS resource index qd which provides RS resources with "QCL-Type D" ('QCL-TypeD') in a TCI state or a QCL assumption of the following parameters 2-1-1 or 2-1-2.

[[Parameter 2-1-1]]

TCI state or QCL assumption of CORESET with a lowest index within the active DL BWP, when CORESET is provided within the active DL BWP.

[[Parameter 2-1-2]]

Active PDSCH TCI state with a lowest ID, when CORESET is not provided within the active DL BWP.

<<Procedure 3>>

For the PUCCH, when the following conditions 3-1 to 3-5 are satisfied, the spatial setting (spatial relation) may follow the following procedure 3-1.

[Condition 3-1]

The UE reports UE capability information (for example, beamCorrespondenceWithoutUL-BeamSweeping) indicating supporting beam correspondence without UL beam sweeping.

[Condition 3-2]

The UE is not provided with a path-loss reference signal (for example, pathlossReferenceRSs) in a PUCCH power control parameter (for example, PUCCH-PowerControl).

[Condition 3-3]

The UE is provided with information (default beam path-loss enabling parameter for the PUCCH, for example, enableDefaultBeamPlForPUCCH) indicating enabling a default spatial relation and a default PL-RS for the PUCCH.

[Condition 3-4]

The UE is not provided with PUCCH spatial relation information (PUCCH-SpatialRelationInfo).

[Condition 3-5]

The UE is not provided with different values for a CORESET pool index (for example, CORESETPoolIndex) in CORESET information (for example, ControlResourceSet) in an active DL BWP of a CC.

[Procedure 3-1]

The spatial setting for PUCCH transmission from the UE is the same as the spatial setting for PDCCH reception by the UE in CORESET with a lowest ID on an active DL BWP of its primary cell (PCell).

<<Procedure 4>>

For the SRS, when the following conditions 4-1 to 4-4 are satisfied, the UE may follow the following procedure 4-1.

[Condition 4-1]

The default beam path-loss enabling information for the SRS (for example, higher layer parameter enableDefaultBeamPIForSRS) is set to "enabled".

[Condition 4-2]

The spatial relation information (for example, higher layer parameter spatialRelationInfo) for SRS resources other than the SRS resource having the application (higher layer parameter usage) in the SRS resource set set to "beam management (for example, beamManagement)" or the SRS resource having the application in the SRS resource set set to "nonCodeBook with a configuration of the associated CSI-RS (for example, associatedCSI-RS) is not configured in FR2.

[Condition 4-3]

The UE is not configured with a path-loss reference RS (for example, higher layer parameter pathlossReferenceRS).

[Condition 4-4]

The UE is not provided with different values for a CORESET pool index (for example, CORESETPoolIndex) in CORESET information (for example, ControlResourceSet) in an active DL BWP of a CC.

[Procedure 4-1]

The UE transmits a target SRS resource with a spatial domain transmission filter of the following parameter 4-1-1 or 4-1-2.

[[Parameter 4-1-1]]

Spatial domain transmission filter used to receive CORESET with the lowest CORESET ID in the active DL BWP in the CC.

[[Parameter 4-1-2]]

Spatial domain transmission filter used to receive the active TCI state with the lowest ID among the active TCI states applicable to PDSCH in the active DL BWP of the CC, when the UE does not configure any CORESET in the CC.

According to the fourth embodiment described above, the UE can appropriately determine the default spatial relation/default PL-RS for UL transmission, when a single TRP is configured.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 3:
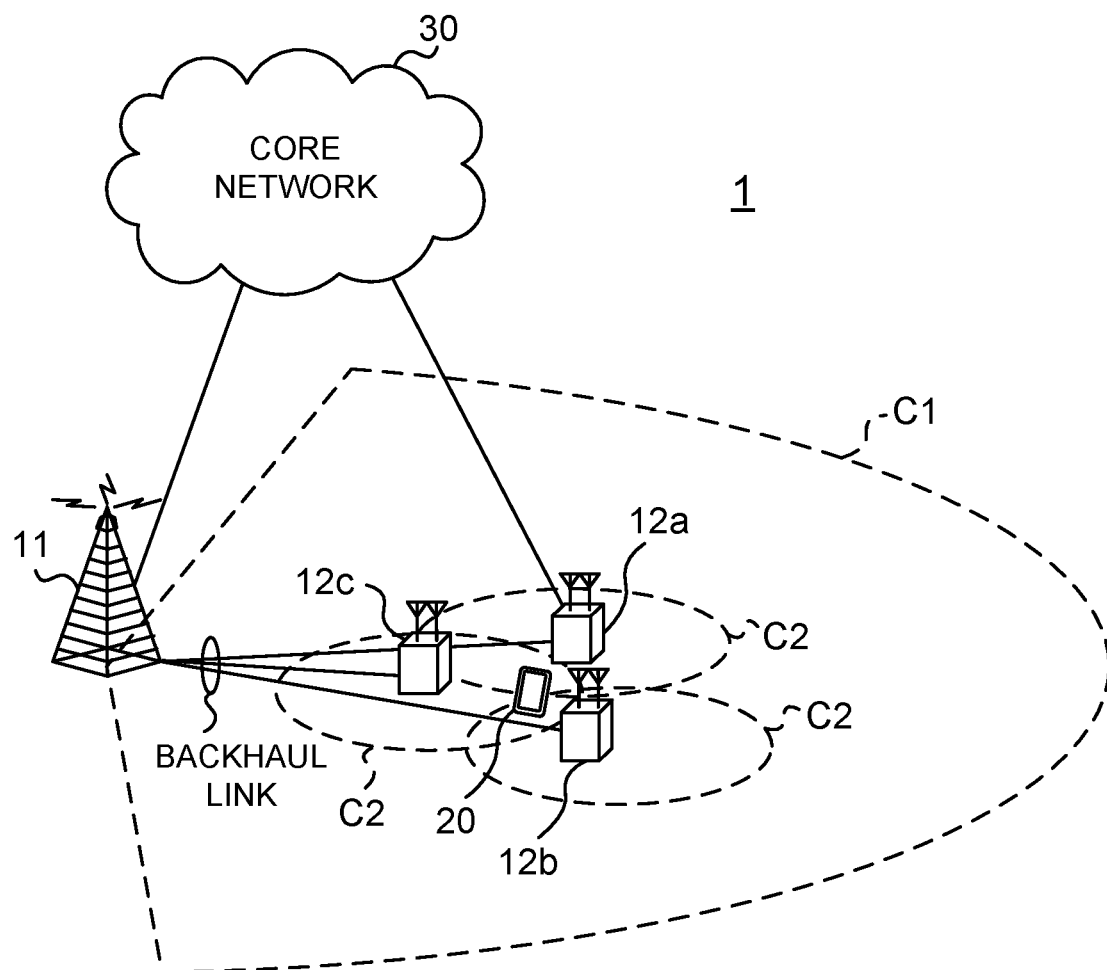
FIG. 3 is a diagram illustrating an example of a schematic configuration of a radio communication system according to one embodiment.

FIG. 3 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Furthermore, the radio communication system 1 may support dual connectivity between a plurality of radio access technologies (RATS) (multi-RAT dual connectivity (MR-DC)). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) using a plurality of component carriers (CC) or dual connectivity (DC).

Each CC may be included in at least one of a first frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a wireless manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that, the DCI for scheduling the PDSCH may be referred to as DL assignment, DL DCI, or the like, and the DCI for scheduling the PUSCH may be referred to as UL grant, UL DCI, or the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space on the basis of search space configuration.

One search space may correspond to a PDCCH candidate corresponding to one or more aggregation levels. One or more search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, the DMRS may also be referred to as a user terminal-specific reference signal (UE-specific reference signal).

(Base Station)

Figure 4:
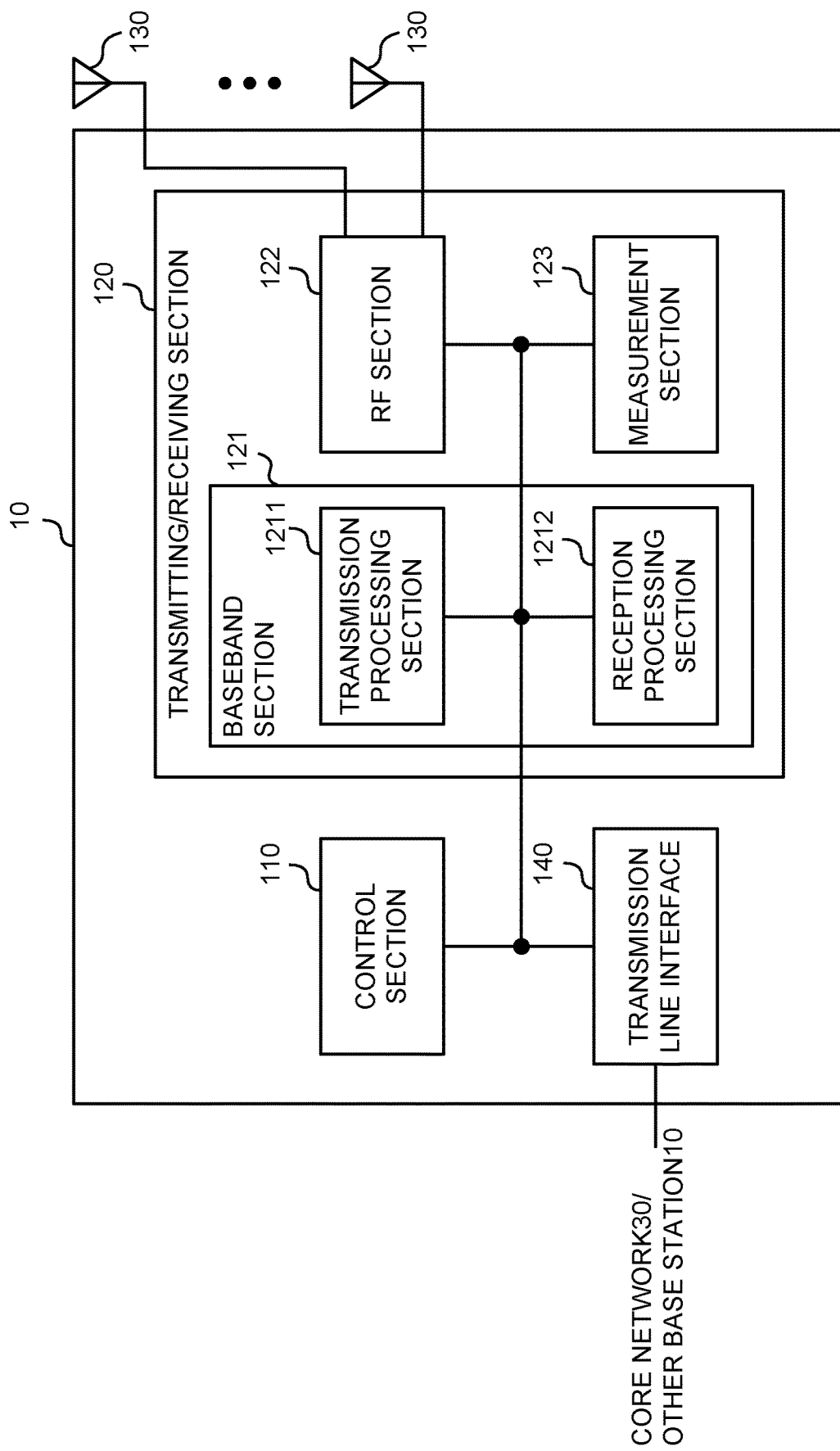
FIG. 4 is a diagram illustrating an example of a configuration of a base station according to one embodiment.

FIG. 4 is a diagram illustrating an example of a configuration of a base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like that are described on the basis of common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a base band circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam (Tx beam) or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a base band signal.

The transmitting/receiving section 120 (RF section 122) may perform modulation to a radio frequency range, filtering processing, amplification, and the like on the base band signal, to transmit a signal in the radio frequency range via the transmission/reception antenna 130.

Meanwhile, the transmitting/receiving section 120 (RF section 122) may perform amplification, filtering processing, demodulation to a base band signal, and the like on the signal in the radio frequency range received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired base band signal, to acquire user data and the like.

The transmitting/receiving section 120 (measurement section 123) may perform measurement on the received signal. For example, the measurement section 123 may perform radio resource management (RRM) measurement, channel state information (CSI) measurement, and the like on the basis of the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

In a case where a plurality of different TCI states mapped to a transmission configuration indication (TCI) code point are not provided, when spatial relation information and path-loss reference signal information for uplink transmission are not provided and default spatial relation and path-loss reference signal enabling information for the uplink transmission is provided, the control section 110 may determine a quasi-co-located (QCL) parameter for downlink. The transmitting/receiving section 120 may receive the uplink transmission transmitted using the QCL parameter.

(User Terminal)

Figure 5:
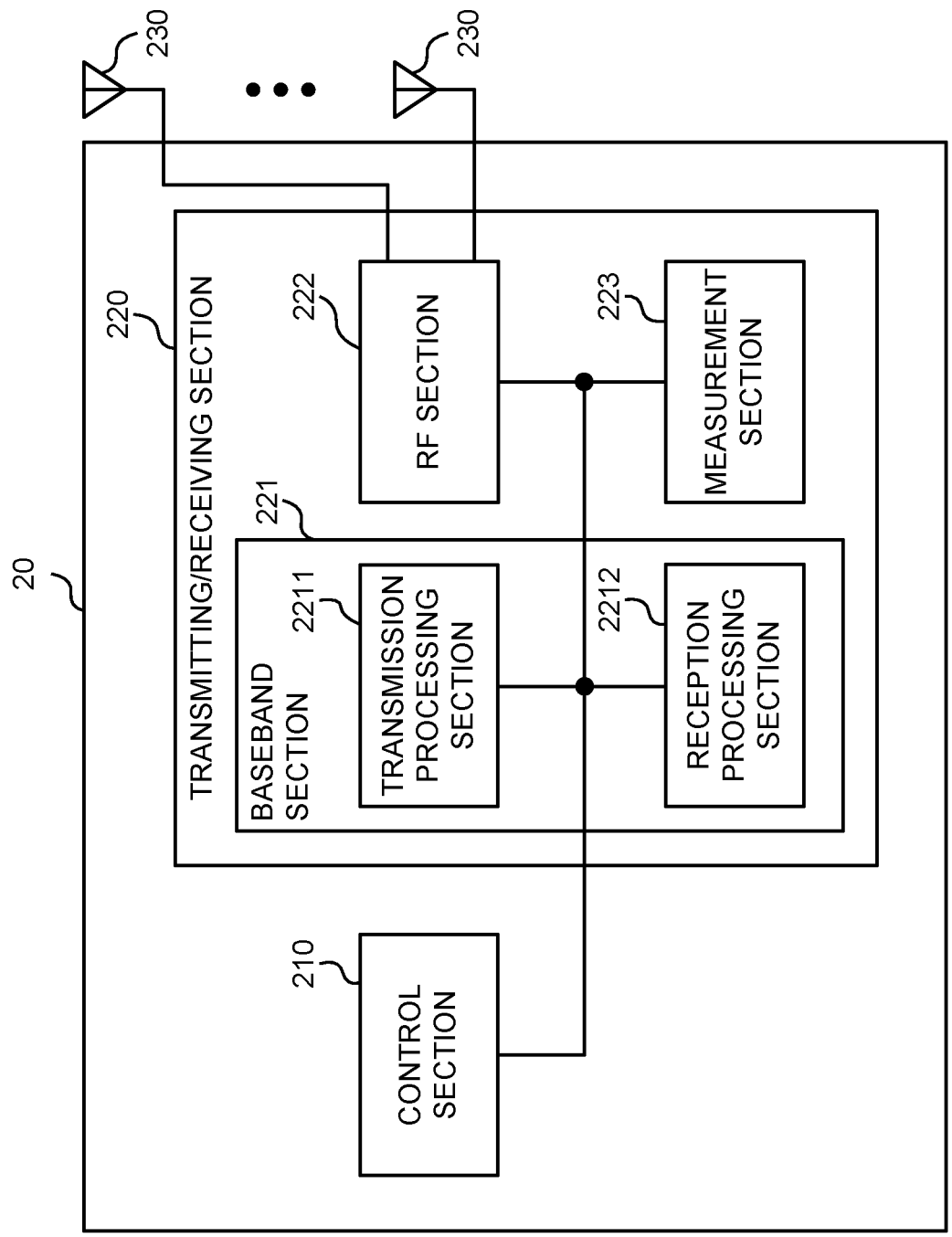
FIG. 5 is a diagram illustrating an example of a configuration of a user terminal according to one embodiment.

FIG. 5 is a diagram illustrating an example of a configuration of a user terminal according to one embodiment. The user terminal 20 includes a control section 210, a transmitting/receiving section 220, and a transmission/reception antenna 230. Note that one or more control sections 210, one or more transmitting/receiving sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like, which are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a base band circuit, a filter, a phase shifter, a measurement circuit, a transmission/reception circuit, and the like, which are described on the basis of common recognition in the technical field related to the present disclosure.

The transmitting/receiving section 220 may be configured as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna, which is described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam (Tx beam) or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a base band signal.

Note that whether or not to apply DFT processing may be determined on the basis of configuration of transform precoding. When transform precoding is enabled for a channel (for example, PUSCH), the transmitting/receiving section 220 (transmission processing section 2211) may perform DFT processing as the above-described transmission processing in order to transmit the channel by using a DFT-s-OFDM waveform, and if not, the DFT processing does not have to be performed as the transmission processing.

The transmitting/receiving section 220 (RF section 222) may perform modulation to a radio frequency range, filtering processing, amplification, and the like on the base band signal, and may transmit a signal in the radio frequency range via the transmission/reception antenna 230.

Meanwhile, the transmitting/receiving section 220 (RF section 222) may perform amplification, filtering processing, demodulation to a base band signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired base band signal to acquire user data and the like.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmission section and the receiving section of the user terminal 20 in the present disclosure may include at least one of the transmitting/receiving section 220, the transmission/reception antenna 230, or the transmission line interface 240.

In a case where a plurality of different TCI states mapped to a transmission configuration indication (TCI) code point are not provided, when spatial relation information and path-loss reference signal information for uplink transmission (for example, PUCCH, SRS, and PUSCH) are not provided and default spatial relation and path-loss reference signal enabling information for the uplink transmission is provided, the control section 210 may determine a quasi-co-located (QCL) parameter (for example, TCI state or QCL assumption) for downlink. The transmitting/receiving section 220 may transmit the uplink transmission using the QCL parameter (first embodiment).

The QCL parameter may be based on either a TCI state (for example, in a case where CORESET is configured) of the control resource set (CORESET) with the lowest index in the active downlink bandwidth part (BWP) or an active TCI state (for example, in a case where CORESET is not configured) with the lowest ID among the active TCI states for the physical downlink shared channel.

In at least one of a case where at least one transmission configuration indication (TCI) code point indicates two TCI states or a case where a physical downlink control channel configuration including two different values of a control resource set (CORESET) pool index is provided, when spatial relation information and path-loss reference signal information for uplink transmission are not provided and default spatial relation and path-loss reference signal enabling information for the uplink transmission is provided, the control section 210 may determine a quasi-co-located (QCL) parameter for downlink. The transmitting/receiving section 220 may transmit the uplink transmission using the QCL parameter (second and third embodiments).

The QCL parameter may be based on either a TCI state (second embodiment) corresponding to a lowest code point among TCI code points including two different TCI states, or a TCI state (third embodiment) of a CORESET associated with a monitored search space and having a lowest CORESET-ID among CORESETs that are configured with a same value of a CORESET pool index as a PDCCH that schedules a PDSCH.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a wireless manner, or the like, for example) and using these apparatuses. The functional block may be implemented by combining the one or the plural apparatuses with software.

Here, functions include, but are not limited to, determining, determining, judging, computing, calculating, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning. For example, a functional block (component) that has a transmission function may be referred to as a transmitting section (transmitting unit), a transmitter, and the like. In any case, as described above, the implementation method is not particularly limited.

Figure 6:
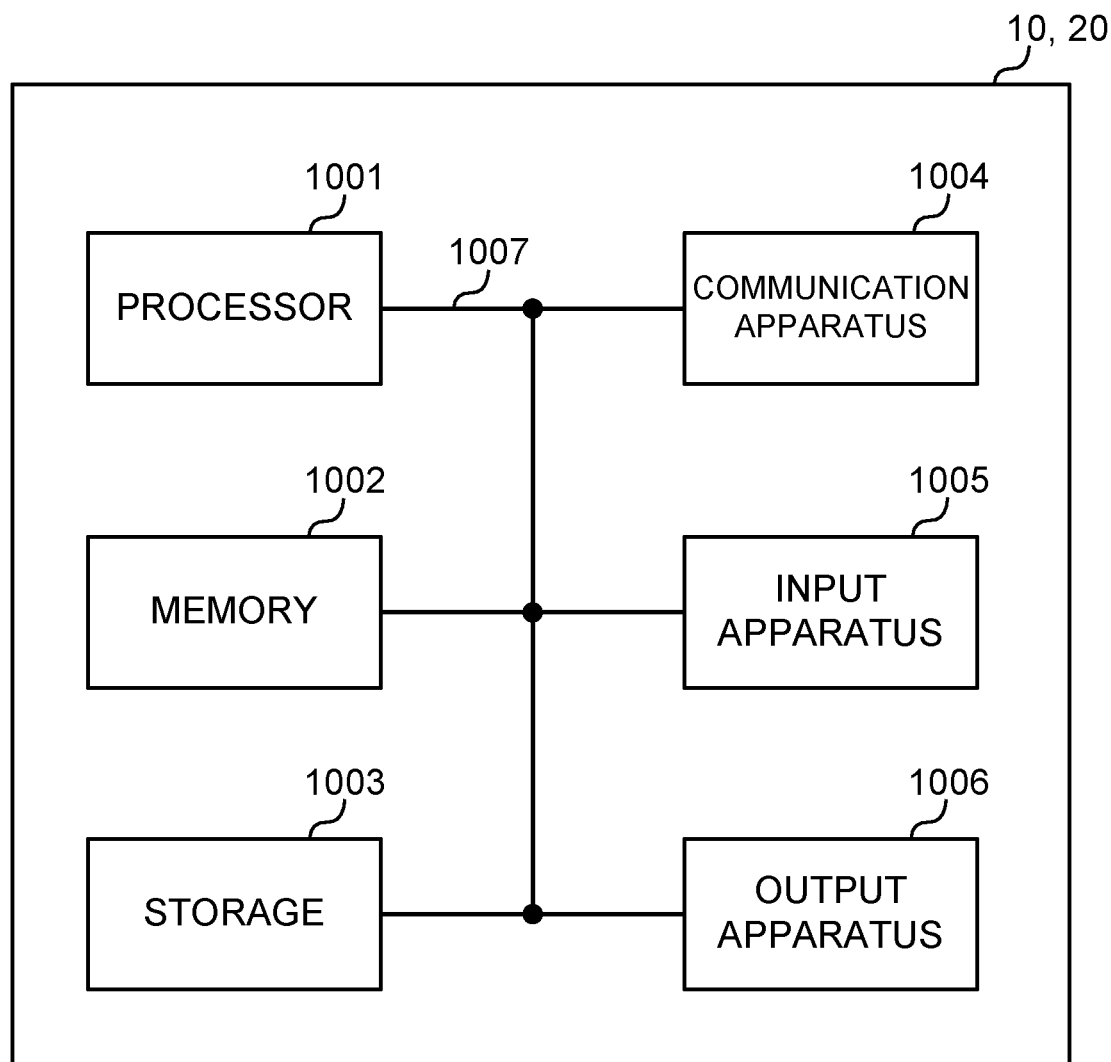
FIG. 6 is a diagram illustrating an example of a hardware configuration of the base station and the user terminal according to one embodiment.

For example, the base station, the user terminal, and so on according to one embodiment of the present disclosure may function as a computer that executes the processing of the radio communication method of the present disclosure. FIG. 6 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that, in the present disclosure, the terms such as an apparatus, a circuit, a device, a section, or a unit can be replaced with each other. The hardware configuration of the base station 10 and the user terminal 20 may be configured including one or a plurality of the apparatuses illustrated in the drawings, or may be configured without including some apparatuses.

For example, although only one processor 1001 is illustrated, there may be a plurality of processors. Further, the processing may be executed by one processor, or the processing may be executed by two or more processors simultaneously or sequentially, or by using other methods. Note that, the processor 1001 may be implemented with one or more chips.

For example, each function of the base station 10 and the user terminal 20 is implemented by causing predetermined software (program) to be read onto hardware such as the processor 1001 and the memory 1002, and by the processor 1001 performing arithmetic operation to control communication via the communication apparatus 1004 and control at least one of reading or writing of data in the memory 1002 and the storage 1003.

The processor 1001 controls the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads a program (program code), a software module, data, and the like from at least one of the storage 1003 or the communication apparatus 1004 into the memory 1002, and executes various types of processing in accordance with these. As the program, a program that causes a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 may store a program (program code), a software module, and the like executable for implementing the radio communication method according to an embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmitting/receiving device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented by being physically or logically separated into the transmitting section 120a (220a) and the receiving section 120b (220b).

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, apparatuses such as the processor 1001 and the memory 1002 are connected to each other by the bus 1007 for communicating information. The bus 1007 may be formed by using a single bus, or may be formed by using different buses for respective connections between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

VARIATIONS

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in a time domain. Each of the one or more periods (frames) included in the radio frame may be referred to as a subframe. Further, the subframe may include one or more slots in the time domain. The subframe may have a fixed time length (for example, 1 ms) that does not depend on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, or the like.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as a PDSCH (PUSCH) mapping type B.

The radio frame, subframe, slot, mini slot, and symbol all represent a time unit when transmitting a signal. The radio frame, the subframe, the slot, the mini slot, and the symbol may be called by other applicable names, respectively. Note that, the time units such as the frame, subframe, slot, mini slot, and symbol in the present disclosure may be replaced with each other.

For example, one subframe may be referred to as a TTI, a plurality of consecutive subframes may be referred to as a TTI, or one slot or one mini slot may be referred to as a TTI. That is, at least one of the subframe or the TTI may be a subframe (1 ms) in the existing LTE, may be a period shorter than 1 ms (for example, one to thirteen symbols), or may be a period longer than 1 ms. Note that, the unit indicating the TTI may be referred to as the slot, mini slot, and the like instead of the subframe.

Here, the TTI refers to, for example, the minimum time unit of scheduling in the radio communication. For example, in the LTE system, a base station performs scheduling to allocate radio resources (a frequency bandwidth, transmission power, and the like that can be used in each user terminal) to each user terminal in TTI units. Note that, definition of the TTI is not limited to this.

The TTI may be a transmission time unit of channel coded data packet (transport block), code block, codeword, and the like, or may be a processing unit of scheduling, link adaptation, and the like. Note that, when the TTI is given, a time interval (for example, the number of symbols) to which the transport block, code block, codeword, and the like are actually mapped may be shorter than the TTI.

Note that, when one slot or one mini slot is referred to as the TTI, one or more TTIs (that is, one or more slots or one or more mini slots) may be the minimum time unit of scheduling. Furthermore, the number of slots (the number of mini slots) forming the minimum time unit of the scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that, the long TTI (for example, the usual TTI, subframe, and the like) may be replaced with a TTI having a time length longer than 1 ms, and the short TTI (for example, the shortened TTI and the like) may be replaced with a TTI having a TTI length shorter than the TTI length of the long TTI and not shorter than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined on the basis of the numerology.

Furthermore, the RB may include one or more symbols in the time domain, and have the length of one slot, one mini slot, one subframe, or one TTI. One TTI, one subframe, and the like may include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and numbered within the BWP.

The BWP may include a BWP for UL (UL BWP) and a BWP for DL (DL BWP). For the UE, one or more BWPs may be configured within one carrier.

At least one of the configured BWPs may be active, and it is not necessary to assume that the UE transmits and receives a predetermined signal/channel outside the active BWP. Note that, a "cell", a "carrier", and the like in the present disclosure may be replaced with a BWP.

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information, parameters, and the like described in the present disclosure may be represented using absolute values, represented using relative values with respect to given values, or represented using other corresponding information. For example, the radio resource may be indicated by a predetermined index.

The names used for the parameters and the like in the present disclosure are not limited names in any respect. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented using any of various different technologies. For example, the data, instruction, command, information, signal, bit, symbol, chip, and the like that may be referred to throughout the above description may be represented by the voltage, current, electromagnetic wave, magnetic field or magnetic particle, optical field or photon, or any combination thereof.

Furthermore, the information, signals, and the like may be output in at least one of a direction from a higher layer to a lower layer or a direction from the lower layer to the higher layer. The information, signals, and the like may be input and output via a plurality of network nodes.

The information, signals, and the like that are input and output may be stored in a specific location (for example, in a memory), or may be managed using a management table. The information, signals, and the like to be input and output can be overwritten, updated, or appended. The output information, signals, and the like may be deleted. The information, signals, and the like that are input may be transmitted to other apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Furthermore, notification of predetermined information (for example, notification of "being X") does not necessarily have to be explicit, and may be given implicitly (for example, by not giving notification of the predetermined information or by notification of other information).

Judging may be performed by a one-bit value (0 or 1), by a Boolean indicated by true or false, or by comparison of numerical values (for example, comparison with a given value).

Regardless of whether software is referred to as software, firmware, middleware, microcode, or hardware description language, or referred to by other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Also, software, instructions, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmission apparatus, a reception apparatus, a radio communication apparatus, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel, a downlink channel, and the like may be replaced with a side channel.

Similarly, the user terminal in the present disclosure may be replaced with a base station. In this case, the base station 10 may have the function of the user terminal 20 described above.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

Each aspect/embodiment described in the present disclosure may be used alone, used in a combination, and switched in association with execution. Further, the order of processing procedures, sequences, flowcharts, and the like of the aspects/embodiments described in the present disclosure may be re-ordered as long as there is no inconsistency. For example, regarding the method described in the present disclosure, elements of various steps are presented using an exemplary order, and the order is not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The term "on the basis of" used in the present disclosure does not mean "only on the basis of" unless otherwise specified. In other words, the term "on the basis of" means both "only on the basis of" and "at least on the basis of".

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as judging, calculating, computing, processing, deriving, investigating, looking up, search, inquiry (for example, looking up in a table, database, or another data structure), ascertaining, and the like.

Furthermore, "determining" may be regarded as receiving (for example, receiving of information), transmitting (for example, transmitting of information), inputting, outputting, accessing (for example, accessing data in a memory), and the like.

Further, "determining" may be regarded as resolving, selecting, choosing, establishing, comparing, and the like. That is, "determining" may be regarded as a certain operation.

Furthermore, "determining" may be replaced with "assuming", "expecting", "considering", and the like.

The "maximum transmission power" described in the present disclosure may mean a maximum value of transmission power, a nominal maximum transmission power (the nominal UE maximum transmit power), or a rated maximum transmission power (the rated UE maximum transmit power).

As used in the present disclosure, the terms "connected" and "coupled," or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other." Note that the phrase may mean that "A and B are different from C". Terms such as "leave", "coupled", or the like may also be interpreted in the same manner as "different".

When the terms such as "include," "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, where translations add articles, such as a, an, and the in English, the present disclosure may include that the noun that follows these articles is in the plural.

Now, although the invention according to the present disclosure has been described in detail above, it should be obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The invention claimed is:

1. A terminal comprising:
a processor that, when multiple different transmission configuration indication (TCI) states mapped to a TCI codepoint are not provided, if spatial relation information and pathloss reference signal information for uplink transmission are not provided and enabling information for a default spatial relation and a pathloss reference signal for the uplink transmission is provided, determines a downlink quasi-co-location (QCL) parameter; and
a transmitter that transmits the uplink transmission by using the QCL parameter.

2. A terminal comprising:
a processor that, when different values of a control resource set (CORESET) pool index in CORESET information are not provided, if spatial relation information and pathloss reference signal information for uplink transmission are not provided and enabling information for a default spatial relation and a pathloss reference signal for the uplink transmission is provided, determines a downlink quasi-co-location (QCL) parameter; and
a transmitter that transmits the uplink transmission by using the QCL parameter.

3. The terminal according to claim 1, wherein the QCL parameter is based on either one of a TCI state of a CORESET with a lowest index within an active downlink bandwidth part (BWP) and an active TCI state with a lowest ID among active TCI states for a physical downlink shared channel.

4. The terminal according to claim 2, wherein the QCL parameter is based on either one of a TCI state of a CORESET with a lowest index within an active downlink bandwidth part (BWP) and an active TCI state with a lowest ID among active TCI states for a physical downlink shared channel.

5. A radio communication method for a terminal, comprising:
when multiple different transmission configuration indication (TCI) states mapped to a TCI codepoint are not provided, if spatial relation information and pathloss reference signal information for uplink transmission are not provided and enabling information for a default spatial relation and a pathloss reference signal for the uplink transmission is provided, determining a downlink quasi-co-location (QCL) parameter; and
transmitting the uplink transmission by using the QCL parameter.

6. A base station comprising:
a processor that, when multiple different transmission configuration indication (TCI) states mapped to a TCI codepoint are not provided, if spatial relation information and pathloss reference signal information for uplink transmission are not provided and enabling information for a default spatial relation and a pathloss reference signal for the uplink transmission is provided, determines a downlink quasi-co-location (QCL) parameter; and
a receiver that receives the uplink transmission transmitted by using the QCL parameter.

7. A system comprising a terminal and a base station, wherein
the terminal comprises:
a processor that, when multiple different transmission configuration indication (TCI) states mapped to a TCI codepoint are not provided, if spatial relation information and pathloss reference signal information for uplink transmission are not provided and enabling information for a default spatial relation and a pathloss reference signal for the uplink transmission is provided, determines a downlink quasi-co-location (QCL) parameter; and
a transmitter that transmits the uplink transmission by using the QCL parameter, and
the base station comprises:
a receiver that receives the uplink transmission.

* * * * *